E. TOMER.
SPRINKLING MACHINE.
APPLICATION FILED JULY 6, 1908.
937,660.
Patented Oct. 19, 1909.
3 SHEETS—SHEET 3.
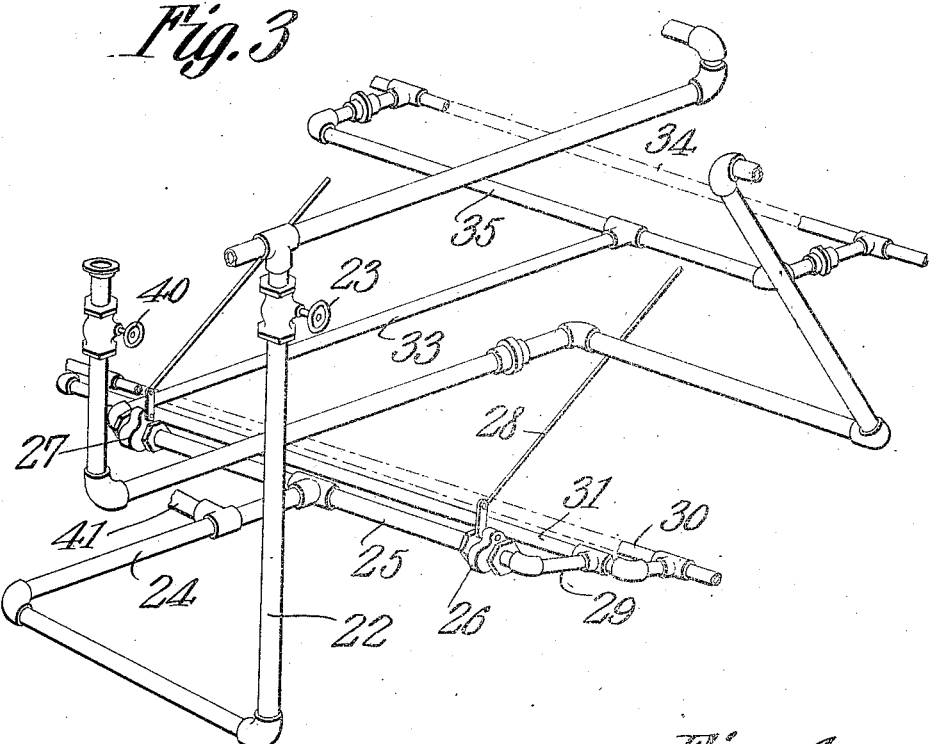
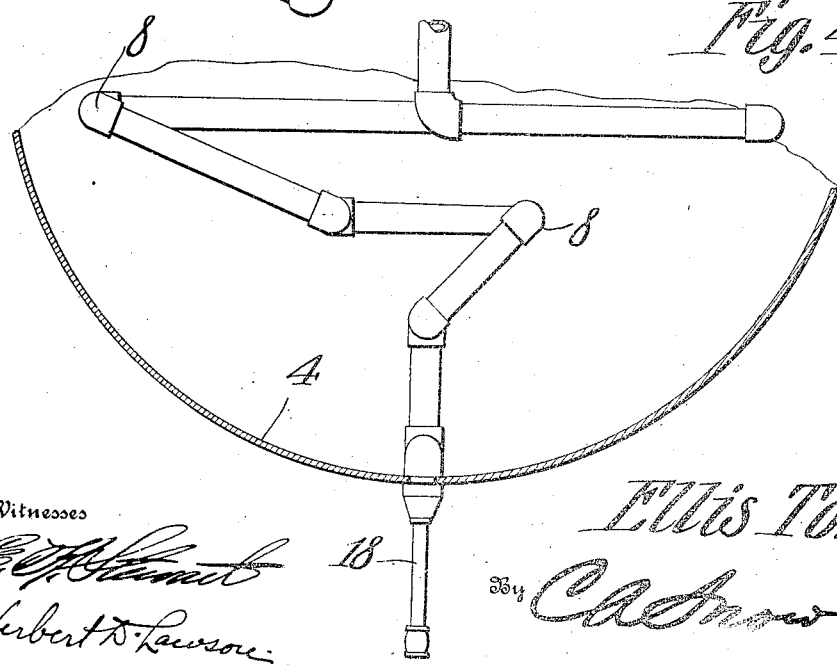
Witnesses
Inventor
Ellis Tomer.
By
Attorneys

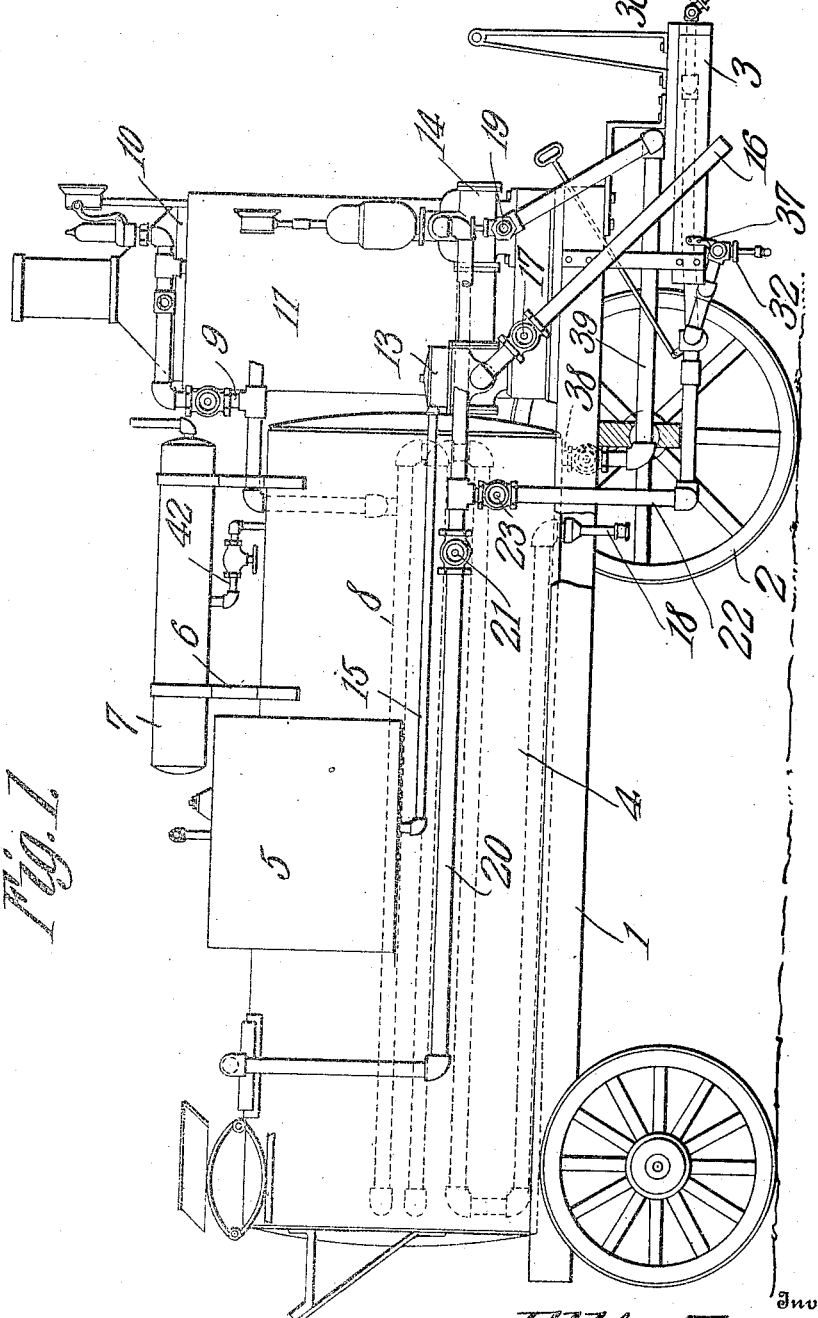

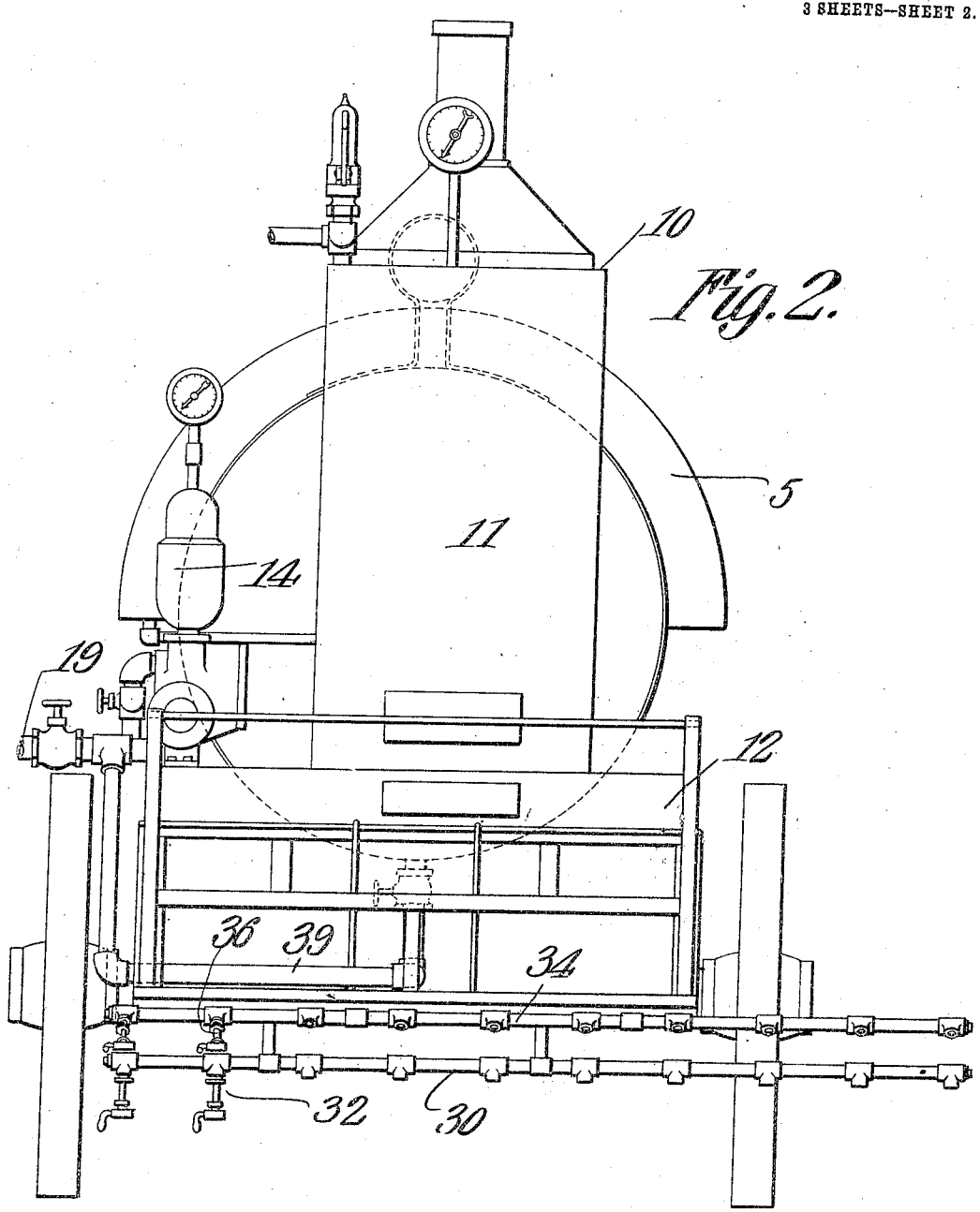

UNITED STATES PATENT OFFICE.

ELLIS TOMER, OF VISALIA, CALIFORNIA.

SPRINKLING-MACHINE.

937,660.

Specification of Letters Patent.   Patented Oct. 19, 1909.

Application filed July 6, 1908.   Serial No. 442,144.

*To all whom it may concern:*

Be it known that I, ELLIS TOMER, a citizen of the United States, residing at Visalia, in the county of Tulare and State of California, have invented a new and useful Sprinkling-Machine, of which the following is a specification.

This invention relates to sprinkling machines and more particularly to that type for use in sprinkling oil upon roads.

The object of the invention is to provide a machine of this character having means whereby oil contained within the tank may be thoroughly heated before being supplied to the spraying nozzles, thus keeping the liquid in a thin condition and avoiding any danger of the same congealing or thickening within the apparatus and interfering with its proper operation.

Another object is to provide a machine of this character having means whereby the heated oil can be discharged under pressure through the spraying nozzles.

With these and other objects in view the invention consists of certain novel features of construction and combinations of parts which will be hereinafter more fully described and pointed out in the claim.

In the accompanying drawings is shown the preferred form of the invention.

In said drawings: Figure 1 is a side elevation of the complete machine, one of the rear wheels being removed. Fig. 2 is a rear elevation of the machine, some of the spraying nozzles being removed. Fig. 3 is a perspective view of the oil pipes of the apparatus. Fig. 4 is an end elevation of the heating pipes within the oil tank.

Referring to the figures by characters of reference, 1 designates the frame of the machine, the same being mounted on suitable supporting wheels 2 designed to be propelled in any preferred manner as by means of draft animals or by its own power. A platform 3 is supported below and by the rear portion of the frame 1 and the operator is designed to occupy the same.

Arranged longitudinally upon the frame 1 and extending from the front of said frame to a point adjacent the rear end thereof is a horizontal cylindrical tank 4 for holding oil to be sprinkled. A water jacket 5 straddles the middle portion of this tank and standards 6 are preferably arranged upon the tank and carry a small oil receptacle 7 preferably in the form of a cylinder.

Extending longitudinally within the tank 4 are series of communicating longitudinal pipes 8 forming a heating coil and these pipes communicate through a valved pipe 9 with the steam dome 10 of a boiler 11 mounted on the rear portion of the frame 1 and back of the tank 4. The base 12 of this boiler extends throughout the width of the frame 1 and mounted thereon at one side of the boiler is an engine 13 designed to drive a pump 14 which is also mounted on said base. The boiler is supplied with water from the jacket 5 through a pipe 15 and has an exhaust pipe 16 extending downward at one side of the platform 3, said exhaust pipe being valved as indicated at 17. Steam within the pipes 8 is also designed to exhaust downward from the lowermost pipe 8 through a nozzle 18.

Pump 14 is provided with an intake pipe 19 and a discharge pipe 20. The intake pipe is designed to be connected in any preferred manner, as by means of a hose, with an oil reservoir. The pipe 20 extends outside of the boiler and opens into the top thereof, said pipe having a valve 21 whereby the passage of oil to the boiler may be readily cut off. A branch pipe 22 extends downward from pipe 20 at a point between valve 21 and pump 14 and this branch pipe is provided with a valve 23. Said pipe extends laterally under the platform 1 and to a point under the center of the platform where it extends longitudinally in a rearward direction as indicated at 24 and is connected to a distributing pipe 25 disposed at right angles thereto. This distributing pipe has gate valves 26 and 27 in the end portions thereof, each valve being operated by means of a rod 28 extending upward to points above the platform 3. A pipe 29 extends rearwardly from one end of the distributing pipe 25 and carries a spray head consisting of front and rear communicating pipes 30 and 31, the rear pipe 30 being provided with a series of spraying nozzles 32. A pipe 33 extends rearwardly from the other end of the distributing pipe 25 and carries a spraying head made up of parallel communicating pipes 34 and 35, the rear pipe 34 having a series of spraying nozzles 36 thereon. As shown particularly in Fig. 1 the pipes 34 and 35 and their nozzles 36 are preferably located at a higher elevation than the pipes 30 and 31 and nozzles 32. Moreover, said nozzles 32 are preferably disposed directly under the front portion of the platform 3 while the nozzles 36 are preferably arranged at the rear end of said platform. If desired, brackets 37 may be employed for connecting the pipes 30 and 24 to the platform.

An outlet opening 38 is formed in the bottom of the tank 4 and extending from this outlet and to the intake of the pump 14 is a pipe 39 having a valve 40 for controlling the passage of oil therethrough. If desired, a branch pipe 41 may be extended from the pipe 24 and communicate with an air tank or other receptacle so that surplus oil forced through the pipes to the nozzles, may be accommodated without danger of bursting the pipes.

It is of course to be understood that steam is generated within the boiler 11 and engine 13 and pump 14 are driven thereby. When it is desired to use the apparatus the intake pipe 19 is connected to an oil receptacle and valve 23 is closed and valve 21 opened. Oil will therefore be sucked by the pump from the reservoir and directed through the pipe 20 into tank 4. Steam from the boiler is directed into the coil 8 and the contents of the tank 4 will thus be thoroughly heated. It is of course to be understood that the used steam will exhaust through the nozzle 18. After the tank has been filled with oil the valve 21 is closed and valve 23 opened. Valve 40 is also opened and when the pump 14 is again set in motion oil will be withdrawn from the tank through pipe 39 by the pump and then forced through pipes 20 and 22 to the distributing pipe 25. If it is desired to spray oil from both sets of nozzles 32 and 36 the operator opens both of the valves 26 and 27. It will be understood, however, that either of these sets of nozzles can be used independently of the other set, this being controlled by the two valves 26 and 27.

It will be seen that an apparatus such as herein described is capable of keeping the oil at a high temperature so that it will run freely through the spraying nozzles and will not clog them.

The entire apparatus is very compact and efficient and under the convenient control of the operator.

It is of course to be understood that the fuel tank 7 is connected in any suitable manner as by means of a valved pipe 42 with a hydrocarbon burner, not shown.

By mounting the jacket 5 on the tank 4 the water contained within said jacket is heated by the contents of the tank prior to the discharge of said water into the boiler.

What is claimed is:

A machine of the class described including a portable frame, an oil tank supported thereon, a boiler, means for conveying steam from the boiler and through the tank to heat the contents of the tank, independent series of spraying nozzles supported below and by the frame, a pump on the frame for elevating oil into the tank and for forcing it under pressure from said tank to the series of nozzles, valves below the frame for controlling the supply of oil to the respective series of nozzles, and separate operating means for each valve above the frame.

In testimony that I claim the foregoing as my own, I have hereto affixed my signature in the presence of two witnesses.

ELLIS TOMER.

Witnesses:
 JOSEPH SHERMAN,
 CHAS. T. POOL.